(12) United States Patent
Choate et al.

(10) Patent No.: US 7,002,510 B1
(45) Date of Patent: Feb. 21, 2006

(54) METHOD AND APPARATUS FOR AIR-TO-AIR AIRCRAFT RANGING

(75) Inventors: William Clay Choate, Dallas, TX (US); Charles Emil Frey, Colony, TX (US); James Anthony Jungmann, San Antonio, TX (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 07/456,812

(22) Filed: Dec. 15, 1989

Related U.S. Application Data

(63) Continuation of application No. 07/008,432, filed on Jan. 28, 1987, now abandoned.

(51) Int. Cl.
*G01S 13/08* (2006.01)

(52) U.S. Cl. ............... 342/118; 342/125; 342/146; 342/417; 701/207; 701/223; 701/225

(58) Field of Classification Search ............... 342/450, 342/451, 455, 458, 461, 118, 125, 146, 417; 364/451, 458, 461; 235/412, 414, 416; 701/201, 701/205, 207, 210, 223, 225
See application file for complete search history.

(56) References Cited

U.S. PATENT DOCUMENTS

| | | | | |
|---|---|---|---|---|
| 2,762,565 A | * | 4/1956 | Libman et al. | ............. 235/412 |
| 2,995,296 A | * | 8/1961 | Newell et al. | ............. 235/412 |
| 3,982,246 A | * | 9/1976 | Lubar | ................. 342/458 X |
| 4,224,507 A | * | 9/1980 | Gendreu | ................. 235/412 |
| 4,320,287 A | * | 3/1982 | Rawicz | ................. 364/454 X |
| 4,339,755 A | * | 7/1982 | Wright | ................. 342/458 |
| 4,533,918 A | * | 8/1985 | Virnot | ................. 364/460 X |
| 4,558,323 A | * | 12/1985 | Golinsky | ................. 342/458 |
| 4,613,867 A | * | 9/1986 | Golinsky | ................. 342/458 |
| 4,672,382 A | * | 6/1987 | Fukuhara et al. | ....... 342/451 X |
| 4,734,702 A | * | 3/1988 | Kaplan | ................. 342/424 |
| 4,989,186 A | * | 1/1991 | Ricker | ................. 367/97 |
| 5,280,294 A | * | 1/1994 | Hammerquist | ............. 342/453 |
| 6,275,189 B1 | * | 8/2001 | Rubin | ................. 342/458 |
| 6,388,603 B1 | * | 5/2002 | Frazier et al. | ................. 342/13 |

FOREIGN PATENT DOCUMENTS

EP        237223 A  *  9/1987

OTHER PUBLICATIONS

"Track Parameter Estimation from Multipath Delay Information", Abel, J.; Lashkari, K. Oceanic Engineering, IEEE Journal of vol. 12, Issue 1, Jan. 1987 P(s): 207-221.*

* cited by examiner

*Primary Examiner*—John B. Sotomayor
(74) *Attorney, Agent, or Firm*—Baker Botts L.L.P.

(57) ABSTRACT

A method and apparatus is disclosed for determining the range between two planes, ownship (10) and target (12). Model data (66) estimating the velocity and position of target (12) is compared to actual flight path data of the target (12) passively received by ownship (10). The model data (66) and actual data is compared, and an error measurement is calculated. The model data is also subject to position and velocity constraints (78 and 82) which penalize unrealistic estimates. The error measurement and penalties are used to create a perturbation model (90) which is added to the model data to generate new model data. When the model data (66) conforms closely to the actual data, a range is computed from the model data (66).

39 Claims, 6 Drawing Sheets

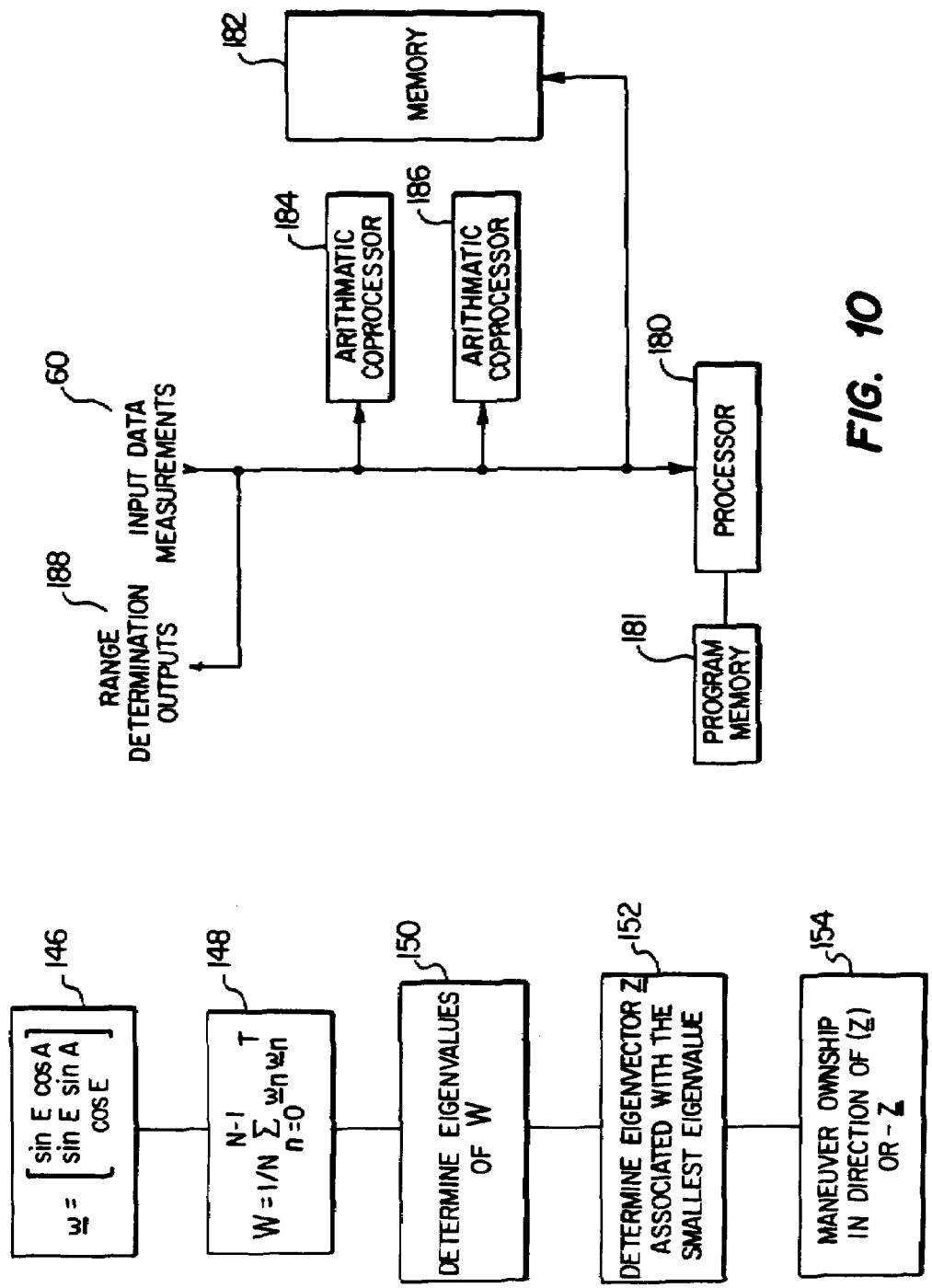

METHOD AND APPARATUS FOR
AIR-TO-AIR AIRCRAFT RANGING

This application is a Continuation of application Ser. No. 07/008,432, filed Jan. 28, 1987 now abandoned.

TECHNICAL FIELD OF THE INVENTION

This invention relates in general to methods and apparatus for determining the range from one aircraft to another aircraft, and more particularly relates to methods and apparatus for determining the range through use of passive energy detection with directional receivers.

BACKGROUND OF THE INVENTION

The goal of air-to-air passive ranging is to determine the range (distance) from one aircraft, called "ownship", to another, called "target", by means of electromagnetic energy emanating from target. For this purpose, ownship is equipped with directional receivers operable to determine the angle of arrival of the incoming energy at various times during a data collection interval. In most applications, the energy detected will be in the radio frequency (RF) or infrared (IR) portions of the spectrum. By combining the directional measurements with measurements of ownship's position and heading, the range between the two aircraft may be determined. The dominant problem in air-to-air passive ranging is ill-conditioning. Ill-conditioning refers to small errors in the directional measurements causing much larger errors in the range estimate. The sources of ill-conditioning include the limited baseline over which data is measured and the need to infer target motion from the data.

Range is estimated from bearing measurements at different locations using some variation of a "triangulation principle". A "baseline" is the distance between two points at which the bearing measurements, called sightings, are taken. Other factors being equal, sightings projected from a long baseline intersect at a greater angle than those taken from a short baseline. Since sightings projected from a short baseline are nearly parallel, a small error in the measured angle results in a large error in determination of range. Hence, range measurements determined using a long baseline are much more impervious to noise contained in the bearing measurements than are those determined over a short baseline. However, the desire to determine range as quickly as possible restricts the baseline that may be developed during data collection. Furthermore, flight path geometry also dictates the maximum baseline which may be used; for example, if two aircraft are flying towards one another, no baseline will be generated regardless of time.

In air-to-ground ranging, the target can be presumed as being fixed in space. Thus, it can be described by a static model consisting of its coordinates in 3-dimensional space. However, this is not true of the air-to-air problem, where target motion must be considered. The additional degrees-of-freedom implied by the dynamic model must be resolved from the data. This aggravates ill-conditioning because it diminishes the redundancy by which information may be distinguished from noise in the data. Unresolved noise in the data produces ranging errors.

As established by the foregoing, a need has arisen to provide a method and apparatus for measuring the range from one aircraft to another, capable of supplying ranging information quickly, while minimizing the effect of small errors in data measurement on the ranging determination.

SUMMARY OF THE INVENTION

In accordance with the present invention, a air-to-air passive ranging apparatus is provided which substantially eliminates or prevents the disadvantages and problems associated with prior art passive ranging systems.

In accordance with another aspect of the invention, a ranging system is provided wherein model data estimating the flight characteristics of the target plane are produced and compared with actual flight path data of the target plane. An error measurement between the model data and the actual flight path data is calculated and adjustment is made to model data which minimizes the error measurement.

In yet another aspect of the invention, the error measurement comprises a means squared sighting error, a velocity related error, and three position related errors. A system error is defined as the sum of the means squared sighting error, the velocity error and the three position errors. A perturbation model is determined such that the sum of the model data and the perturbation model data will result in a new set of model data which reduces the error measurement.

In a further aspect of the invention, a method and apparatus for initializing the model data is provided. In yet a further aspect of the invention, a method and apparatus for determining a flight path which minimizes the effect of noise on the sighting measurements is provided.

BRIEF DESCRIPTION OF THE DRAWINGS

For a more complete understanding of the present invention and the advantages thereof, reference is now made to the following descriptions taken in conjunction with the accompanying drawings in which:

FIG. 7 is a flow chart describing a flight path advisor;

FIG. 10 is a circuit diagram of the ranging system.

DETAILED DESCRIPTION OF THE INVENTION

The preferred embodiment of the present invention is best understood by referring to FIGS. 1–10 of the drawings, like numerals being used for like and corresponding parts of the various drawings.

Figure 1:
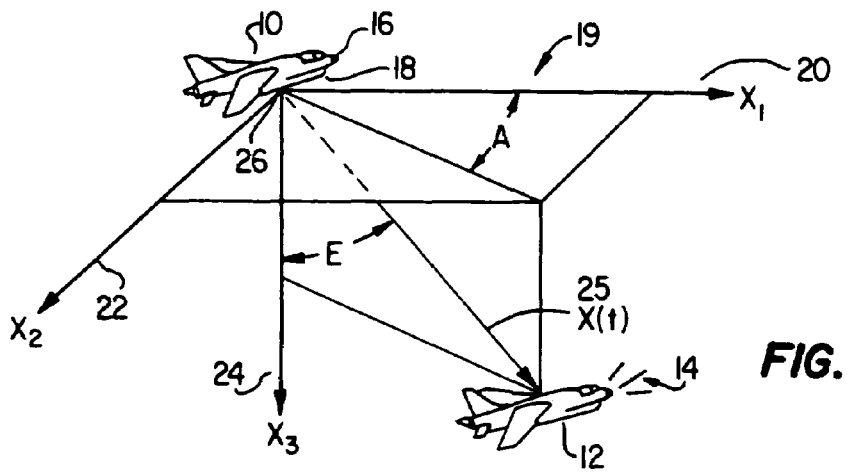
FIG. 1 is a perspective view of an aerial encounter between two aircraft.

FIG. 1 illustrates an aerial encounter between two aircraft. Ownship 10 desires to determine the range between itself and a second aircraft, target 12. Target 12 emits electromagnetic energy, generally indicated by the reference numeral 14. Ownship 10 contains directional receivers 16 operable to determine the angle-of-arrival of the incoming energy forces 14 at various times during a data collection and interval. In addition to the bearing measurements, fixes of ownship's position and heading are monitored by the on-board inertial navigation system (INS) 18. A rectangular coordinate system 19 having an $X_1$ axis 20, an $X_2$ axis 22, and an $X_3$ axis 24, has its center 26 located at ownship. The coordinate system 19 moves in pure translation with ownship 10; however, the directions of the coordinate axes 20–24 are unrelated to the body axes of ownship 10 but are defined in inertial space by the INS 18. For convenience, the bearing measurements from the directional receivers 16 are converted to measurements related to the fixed axes 20–24. The necessary conversions are readily computed from knowledge of ownship's heading as provided by the INS 18.

The location of the target 12 can thus be described as a point in the coordinate system 19 expressed in terms of the three axes 20, 22, and 24. Alternatively, the target can be described in terms of angles from two of the axes, denoted E (for elevation) and A (for azimuth) and ρ (range). It should be noted that an unconventional definition of elevation has been adopted as being the angle between the $X_3$ axis 24 and the vector from the center 26 to the target 12. The angle E and A can be computed from the bearing measurements provided by the directional receivers.

The design of the directional receiver 16 depends upon the spectrum of the energy 14 being monitored. For most applications, the energy will be in either the RF (radio frequency) or IR (infrared portions) of the energy spectrum. RF systems are designed to monitor radar transmissions and RF communications from the target 12. An RF system is capable of detecting energy from very long distances, substantially exceeding the distances at which the target could acquire ownship on its own radar. Since ownship 10 is using a passive ranging system, i.e., not transmitting energy signals itself, ownship 10 may be able to locate target 12 without reciprocal detection. This results in a primary advantage of passive ranging, namely, stealth. Furthermore, long acquisition range also affords ownship more time to respond to the target's presence. In a RF system, the directional receiver 16 may be implemented by using a 2-axis RF interferometer, or multiple interferometer units covering different sectors.

A directional receiver 16 capable of detecting infrared energy signals 14 may be designed to respond to thermally emitted IR radiation from the target. Because of the shorter wave length IR energy signals, the direction of the incoming IR energy can be resolved more precisely. Consequently, the range between the aircraft can be determined more quickly. The infrared system has a further advantage in that performance is not linked to target transmission protocol. However, the maximum acquisition range of the IR system is much shorter than the RF system, thus allowing the target 12 the advantage of detecting ownship 10 on its radar or with a comparable IR system. A directional receiver 16 for the IR system may be implemented using a FLIR (Forward Looking Infra Red) imager and video tracker.

Figure 2A:
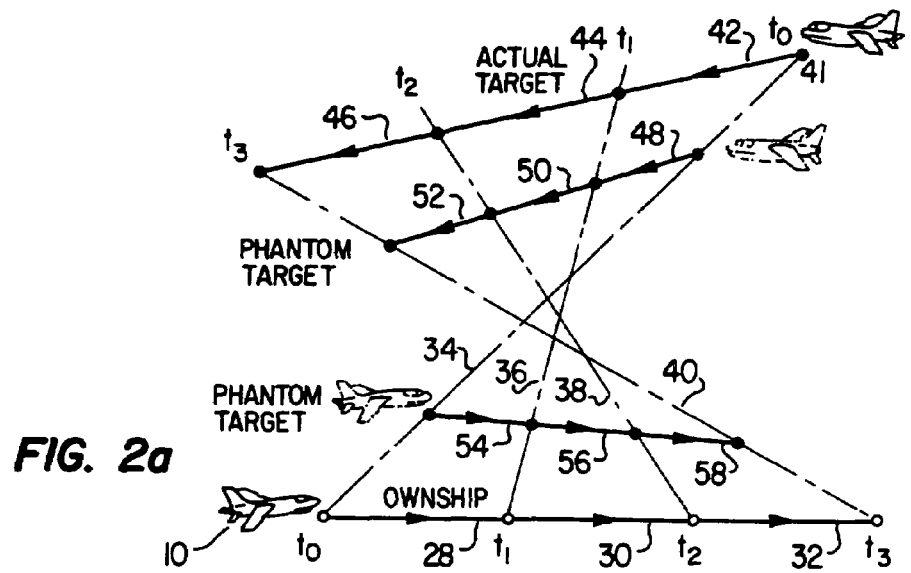
FIGS. 2a–b is a diagram illustrating the ranging problem.
Figure 2B:
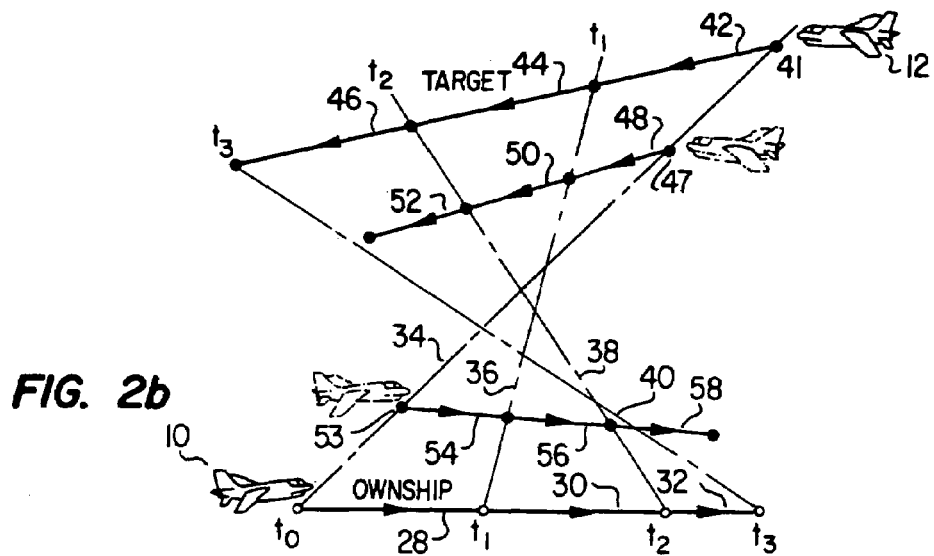

The angles E and A are subject to measurement by the directional receiver 16; however, the range must be determined from the bearing measurements and the INS data. FIGS. 2a–b illustrate that the range between two aircraft 10 and 12 cannot be determined solely on the direction of the sighting vector 25, i.e., the angles E and A, in the absence of acceleration of ownship 10. FIG. 2 shows the flight path of ownship 10. The positions of ownship are shown at $t_0$, $t_1$, $t_2$ and $t_3$. Vector 28 depicts the distance and direction of the flight path of ownship 10 between time periods $t_0$ and $t_1$; likewise, vector 30 indicates ownship flight path between $t_1$ and $t_2$, while vector 32 indicates ownship's flight path between time periods $t_2$ and $t_3$. Sight line 34 indicates the sight vector between ownship 10 and target 12 at time $t_0$; similarly, sight line 36 indicates the sight vector at time $t_1$, sight line 38 indicates the sight vector at time $t_2$ and sight line 40 indicates the sight vector at time $t_3$. Starting point 41 indicates the position of target 12 at the time the first measurement is taken. Vectors 42, 44 and 46 indicate the direction and distance traveled by target 12 during the time period from $t_0$ to $t_3$. From phantom starting point 47, phantom target vectors 48, 50 and 52 indicate a flight path which would provide a possible solution to the range algorithms. From another phantom starting point 53, phantom target vectors 54, 56, and 58 are vectors which would also provide a solution to the ranging algorithm.

At time $t_0$, ownship 10 would receive an energy signal from target 12. From this signal, the directional receivers 16 aboard ownship 10 would be able to determine the direction of the sighting vector 25 between ownship 10 and target 12, but would not be able to determine the magnitude (range) of the sighting vector 25. Thus, at time $t_0$, ownship 10 can only identify target 12 as being somewhere along sighting line 34. From $t_0$ to $t_1$, ownship flies along vector 28. At time $t_1$, ownship takes a another bearing measurement, rendering sight line 36. Once again, ownship 10 knows that target 12 is somewhere along sight line 36, but the exact whereabouts of target 12 is yet unknown. From time $t_1$ to time $t_2$, ownship flies along vector 30. Since ownship is flying at a constant velocity and direction, vectors 28 and 30 are equal in magnitude and colinear. At time $t_2$, another bearing measurement by ownship 10, resulting sight line 38. Whereas the range still cannot be determined from the sight vectors, some pertinent information can be determined from the data.

First, it must be assumed that target 12 is flying at a constant velocity and in a constant direction. This is a valid assumption since most aircraft fly at a nominal speed. Given the assumption of constant velocity, the distance traveled by target 12 between $t_0$–$t_1$ and $t_1$–$t_2$ must be equal. Also, assuming constant direction, the vectors representing the flight path of target 12 must colinear. Given the sight lines 34–40, as shown in FIG. 2a, only one set of vectors will meet the criteria of colinearity and equal magnitude for any given point along the sight line 34 at $t_0$. For example, given the starting point 41 of target 12 along sight line 34, only the flight path given by vectors 42 and 44 will provide a solution in which the vectors are colinear and equal in magnitude. Likewise, given a starting point 47, only the flight path represented by vectors 48 and 50 will result in a solution having colinear vectors of equal magnitude. Further, given starting point 53 on sight line 34, only the vectors 54 and 56 will provide a suitable solution. Unfortunately, in an actual sighting, the starting point 41 of target 12 will be unknown and must be determined by the data.

Even after another time period, the ambiguity cannot be resolved, as illustrated by the sight path vector 46 of the actual target and vectors 52 and 58 of the phantom target. In order to resolve this ambiguity, ownship must accelerate or decelerate, as shown in FIG. 2b.

FIG. 2b depicts the same information as FIG. 2a, with the exception that ownship 10 decelerated after time period $t_2$ resulting in a reduced distance travelled over vector 32. Consequently, the direction of sight line 40 taken at time $t_3$ has changed from FIG. 2a. Due to the deceleration of ownship 10 at t without a corresponding deceleration by target 12, only the flight path defined by vectors 42, 44 and 46 meet the criteria of colinearity and equal magnitude, and hence, the ambiguity is resolved. Thus, the magnitude of the sight vector can be determined from the angles of the sight lines 34, 36, 38 and 40.

However, as can be seen from FIG. 2a, the correct determination of the range is highly dependent upon a accurate measurement of the sight line. For example, a slight change in the angle of sight line 40 taken at $t_3$ in FIG. 2b could result in the intersection of the sight line 40 with the endpoint of vector 52, rather than the endpoint of the actual target vector 46. As can be seen in FIG. 2b, this small error in angle measurement could result in a miscalculation in range of greater than 20%.

The effects of ill-conditioning may be reduced by introducing data redundancy into the equations used to determine the range, i.e., solving the range algorithm over several additional sightings. However, data redundancy may be counterproductive if achieved by reducing the sample interval.

The inability of the direct solution method to deal with ill-conditioning has been overcome by the present invention using a method which does not compute range directly, but rather computes the parameters of a kinematic model of the target. Once an acceptable model is created, range may be computed from the model, rather than the actual bearing measurements. Since the model has a fixed number of parameters, redundancy increases monotonically as more data are assimilated.

Figure 3:
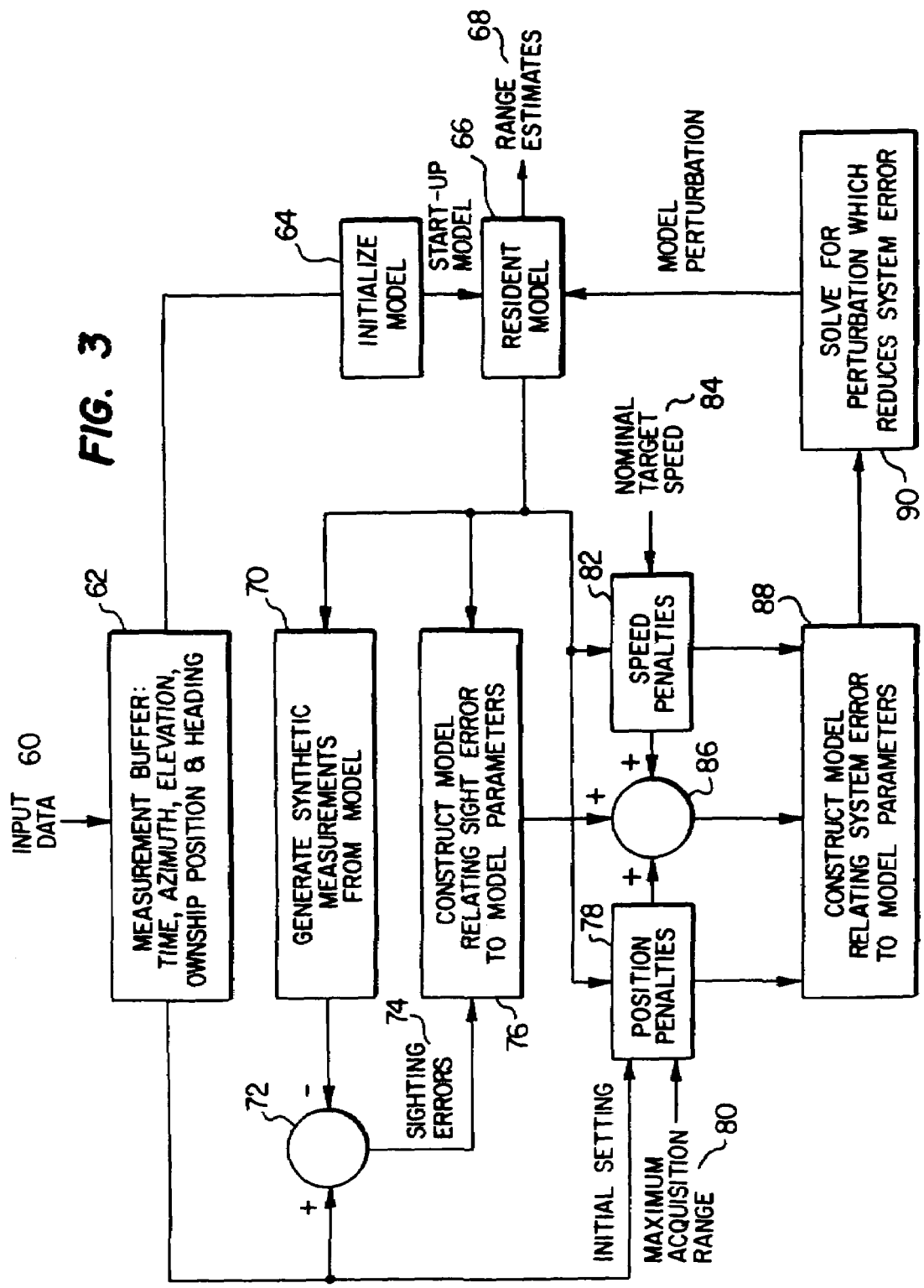
FIG. 3 is a block diagram of the ranging system functional architecture.

FIG. 3 illustrates a functional organization of the air-to-air ranging system functional architecture. Input data 60 is stored in a measurement buffer 62 which holds the input data 60 for successive time frames. Data from the measurement buffer 62 is used to create the initialization model 64. Initialization model 64 is available to a buffer containing the resident model 66 from which range estimates 68 are computed. Resident model 66 is also used to generate estimated azimuth and elevation "synthetic measurements" 70. The synthetic measurements 70 are compared with data from the measurement buffer 62 in a subtracter 72 yielding sighting errors 74. The sighting errors 74 are used in conjunction with the resident model 66 to construct sighting error model 76. A position penalty model 78 is determined using data from the measurement buffer 62, the resident model 66, and data regarding the maximum acquisition range 80. A speed penalty model 82 is assessed using the resident model 66 and data regarding the nominal target speed 84. The position penalty model 78 and the speed penalty model 82 are added to the sighting error model 76 in summation block 86. Data from the summation block 86 along with data from the position penalties 78 and the speed penalty 82 are used to construct an system error model 88. The system error model 88 is used to produce a perturbation model 90. The perturbation model 90 updates the resident model 66. Since a single perturbation of the resident model 66 may not provide a sufficient accuracy between the resident model 66 and the input data 60, the algorithm is iterated until the resident model 66 describes the input data 60 within a predetermined range. After the resident model 66 is sufficiently accurate to correspond with the input data 60, new input data 60 stored in the measurement buffer 62 relating to the next time period is compared with the data from the resident model 66 and the process repeats itself.

In operation, the input data 60 is received from the INS 18 and directional receiver 16. The data includes measurements of time (t), azimuth (A), elevation (E), ownship position relative to initial starting point ($a_1$, $a_2$, $a_3$), and ownship heading ($y_1$, $y_2$ and $y_3$). Azimuth and elevation data are produced by the directional receivers 16 and are adjusted to conform to the coordinate system 19. Ownship position and heading are produced by the INS 18 and likewise conform to the coordinate system 19. Timing data is received from an internal clock.

The input data 60 is stored in a measurement buffer 62. While the input data can be processed substantially in real-time, the measurement buffer 60 is necessary to store the data for use in different tasks, such as producing the initialization model 64, the sighting error 74 and the position penalty 78.

The initialization model block 64 computes the initial estimate of the model parameters. The six model parameters, denoted as the vector $\underline{m}$, describe the position of the target 12 as a function of time, including three coordinates of position ($x_1$, $x_2$ and $x_3$) and a three dimensional velocity vector having components $v_1$, $v_2$ and $v_3$. Since target 12 is assumed to be flying at a constant speed and direction, the velocity $\underline{v}$ can be assumed constant. Calculation of the initialization model block 64 will be described in greater detail in conjunction with FIGS. 8 and 9.

Once the initial model 64 has been determined, it is used as the first resident model 66. The resident model 66 is the system's current best estimate of the target location and velocity. The ranging algorithm revises the resident model 66 at each time interval to correspond with the actual input data over a period of time. Once the resident model 66 can no longer be improved, the system's best estimate of range can be obtained from the model parameters. As each new set of input data 60 is received, a perturbation model 90 is formed to update the resident model 66. The computation of the perturbation model is discussed in connection with FIGS. 3–6.

Synthetic measurements 70 are measurements of elevation (E) and azimuth (A) calculated from the data from the resident model 66. The synthetic measurements 70 would correspond to the actual input data 60 if the resident model 66 was an accurate description of the target 12 and the input data 60 was accurate and noise-free. The relationship between the azimuth and elevation and the model parameters are as follows:

$$A_{mi} = \tan^{-1} \frac{x_2(O) + t_i v_2 + a_2(t_i)}{x_1(O) + t_i v_1 + a_1(t_i)}$$

$$E_{mi} = \tan^{-1} \frac{x_1(O) + t_i v_1 + a_1(t_i))^2 +}{x_3(O) + t_i v_3 + a_3(t_i)}$$

where $E_i$ and $A_i$ are the values computed from the resident model 66 at time $t_i$.

An error function $J(\underline{m})$ is defined by the equation:

$$J(\underline{m}) = 1/N \sum_{i=O}^{N-1} (E_{oi} - E_{mi})^2 + (A_{oi} - A_{mi})^2$$

where $E_{oi}$ and $A_{oi}$ are the observed elevation and azimuth at time $t_i$ and $E_{mi}$ and $A_{mi}$ are the values computed from the resident model 66 at time $t_i$. $J(\underline{m})$ is the mean squared sighting error evaluated with the data from the resident model, $\underline{m}$. The object of the ranging system is to determine a model which minimizes $J(\underline{m})$. Once this model is obtained, range is readily computed from the model parameters. To obtain the model which minimizes $J(\underline{m})$, the resident model 66 is "perturbed" in a direction and magnitude which produces a new resident model which improves correlation between the actual observed data stored in the measurement buffer 62 and the synthetic measurements 70 calculated from the model.

The subtracter 72 provides the sighting errors 74, $E_{oi}-E_{mi}$ and $A_{oi}-A_{mi}$, used in the calculation of the mean squared error function. The mean squared sighting error along with the sighting error perturbation model 76.

The mean squared sighting error of the perturbed model is denoted:

$$J'=J(\underline{m}+\delta \underline{m}), \text{ where } \delta \underline{m} \text{ is the perturbation.}$$

This equation (the "perturbation equation") may be approximated by the second degree model:

$$J'=J(\underline{m})+\delta \underline{m}^T \underline{g} + (\tfrac{1}{2})\delta \underline{m}^T H \delta \underline{m}$$

where g is the gradient of $J(\underline{m})$, a vector whose elements are the partial derivatives of $J(\underline{m})$ with respect to the model parameters, i.e.:

$$g_r = (\partial J/\partial m_r), \text{ for } r=1, 2, \ldots 6$$

The vector g can also be described in relation to the sighting error as:

$$g_J = (-2/N)\sum_{i=O}^{N-1} (\varepsilon_i \nabla E_{mi} + \alpha_i \nabla A_{mi})$$

where $\varepsilon_i$ and $\alpha_i$ are the instantaneous sighting errors for elevation and azimuth:

$$\varepsilon_i = E_{oi}-E_{mi} \text{ and } \alpha_i = A_{oi}-A_{mi}$$

and $\nabla E_{mi}$ and $\nabla A_{mi}$ are the gradients of $E_{mi}$ and $A_{mi}$ with respect to the parameters of the model $\underline{m}$.

The "Hessian" matrix, H, is denoted as:

$$H=[h_{rs}]=[(\partial^2 J)/(\partial m_r \partial m_s)]$$

where $m_r$ and $m_s$ respectively refer to the $r^{th}$ and $s^{th}$ parameter in the set of six model parameters. The H matrix for the sighting error may be approximated by the equation:

$$H_J = (2/N)\sum_{i=O}^{N-1} (\nabla E_{mi} \nabla E_{mi}^T + \nabla A_{mi} \nabla A_{mi}^T)$$

Since the vectors involving $\nabla E_{mi}$ and $\nabla A_{mi}$ have already been computed in determining the gradient of $J(\underline{m})$ (denoted as g in the equations), no new differentiations are required to compute the H matrix.

The Hessian matrix, $H_J$, and the gradient of $J(\underline{m})$, $g_J$, of the sighting error perturbation equation $J(\underline{m})$ are summed with corresponding Hessian matrices and gradients found in relation to speed and position penalties 78 and 82, described below, to render a system error model 88. The system error model 88 is used to create a perturbation model 90.

Position penalties model 78 and speed penalty model 82 provide constraints to the ranging algorithm. "Constraints" provide a mechanism for including real-world knowledge which is not explicitly present in the input data 60 into the ranging algorithms. Constraints restrict the domain of feasible solutions to target models with realistic parameters. Four constraints are employed in the system: a speed constraint, and three position constraints. The position constraints include a maximum range constraint, an elevation position constraint, and an azimuth position constraint. The use of constraints speeds convergence of the resident model 66 and reduces the effect of ill conditioning. While the use of constraints requires additional computational costs, the costs are offset by reduction in the iterations required to achieve convergence of the resident model 66.

The actions of the constraints are indirect rather than direct; since the constraints control functions of the model parameters rather than the parameters themselves. For instance, the speed constraint acts upon the magnitude of the target velocity, i.e., $(v_1^2+v_2^2+v_3^2)^{1/2}$. Clearly, the speed may remain constant even though two or more of the velocity parameters change. Also, it is clear that changes in the position parameters, $x_1$, $x_2$ and $x_3$ do not effect the speed of the target. Therefore, all target parameters may change without affecting the speed, and hence, the speed constraint.

The speed constraint imposes a penalty when the velocity parameters, $v_1$, $v_2$ and $v_3$, describe a target which has a magnitude of velocity deviating significantly from a nominal speed. Most aircraft of the same class fly at approximately the same speed, thus a predetermined nominal speed may be set, and a speed constrained perturbation model may be determined that requires that the target be within a specified tolerance of the predetermined nominal speed.

The function used to determine the speed penalty is:

$$\psi = K[(\mu-\mu_R)/\Delta\mu]^{2M}$$

where:
  $\mu$=target speed determined from model
  $\mu_R$=nominal (predetermined) speed
  K=weight of the constraint
  $\Delta\mu$=bandwidth of the constraint
  M=order of the constraint All of the elements of the speed penalty function are non-negative numbers. The element "$\mu$" is usually determined as the magnitude of the velocity factor, while $\mu_R$ is chosen as the nominal speed of a particular aircraft. The bandwidth, $\Delta\mu$, is choosen in proportion to the uncertainty with which the true target speed is known. The weight=K, is chosen equal to the desired value of the speed penalty when model speed deviates from nominal speed by one bandwidth. The order, M, increases the influence of the constraint beyond the bandwidth. In the preferred embodiment, orders above M=8 are not required, and are avoided, because of the associated numerical overflow and underflow problems in the evaluation of the derivatives in the stop band.

The first and second order partial derivatives of $\psi$ are computed as constituents of the perturbation equations described in conjunction with the sighting error perturbation model $J(\underline{m})$ to render a corresponding Hessian matrix $H_\psi$, and a gradient vector $g_\psi$. Since the constraint is entirely velocity-related, the arguments are reduced from the six used in the sighting error perturbation equations, to three used in the speed constrained perturbation equations. Thus, in computing in the Hessian matrix of the speed constrained perturbation equations, only six second order partial derivatives are computed, rather than the twenty-one computed in connection with the sighting error perturbation equation. Furthermore, the constraint $\psi$ is not time-dependent, as is the calculation for mean squared sighting error $J(\underline{m})$. Therefore, time-iterative calculations need not be performed to compute $\psi$.

The position constraints require that the components of the target model associated with the initial position lie within a "cone" centered about the initial sighting vector. The angular cross-section of the cone is sized according to the uncertainty of sighting measurements, and is a statistical choice.

A penalty is associated with each position constraints: a elevation position penalty, an azimuth position penalty, and a maximum range penalty. The equations for these penalties are:

$$P_e = K_e[(E_{oi} - E_{mi})/\Delta E]^{2Me}$$

$$P_a = K_e[(A_{oi} - A_{mi})/\Delta E]^{2Ma}$$

$$P_r = K_r \exp[\alpha(\rho - \rho_r)/\rho_r]$$

The constants $K_e$, $K_a$, $K_r$, Me, Ma, and $\alpha$ are chosen as described in conjunction with the speed penalty. $\Delta E$ and $\Delta A$ are chosen in proportion to the uncertainty with which the true target elevation and azimuth are known. The factor $\rho_r$ is set equal to the maximum acquisition range.

Three position penalty models are constructed, one for each of the three penalty equations. The position penalty models are determined as described above in connection with the sighting error model rendering equations for a Hessian matrix and gradient vector for each penalty model. As with the velocity penalty, the Hessian matrix for the position penalty equations is limited to the three position parameters—$x_1$, $x_2$ and $x_3$.

After computation of the sighting error model 76, speed constrained model 82 and three position models 78, the models are summed to create a system model 88. The equations used to define the system model are:

$$J_s = J(\underline{m}) + \psi + P_e + P_a + P_r$$

$$H_s = H_j + H_\psi + H_{Pe} + H_{Pa} + H_{Pr}$$

$$\underline{g}_s = \underline{g}_j + \underline{g}_\psi + \underline{g}_{Pe} + \underline{g}_{Pa} + \underline{g}_{Pr}$$

Several methods exist for minimizing the mean squared error $J_s(\underline{m})$. The preferred method is the Newton-Raphson method, which converges faster and provides for larger perturbations than other methods, such as the gradient method. A key step of the Newton-Raphson method is to solve $H_s \delta \underline{m} = \underline{g}_s$. A flow chart of the preferred method for solving this equation is given in FIG. 4. In block 92, a Cholesky factorization is performed. The Cholesky factorization involves factoring the $H_s$ matrix into lower and upper diagonal matrices, L and $L^T$. In block 94, the equation $L\underline{y} = \underline{g}_s$ is solved for the vector $\underline{y}$ (L and $\underline{g}_s$ are known). In block 96, the equation, $L^T \delta \underline{m} = \underline{y}$ is solved for $\delta \underline{m}$.

Figure 4:
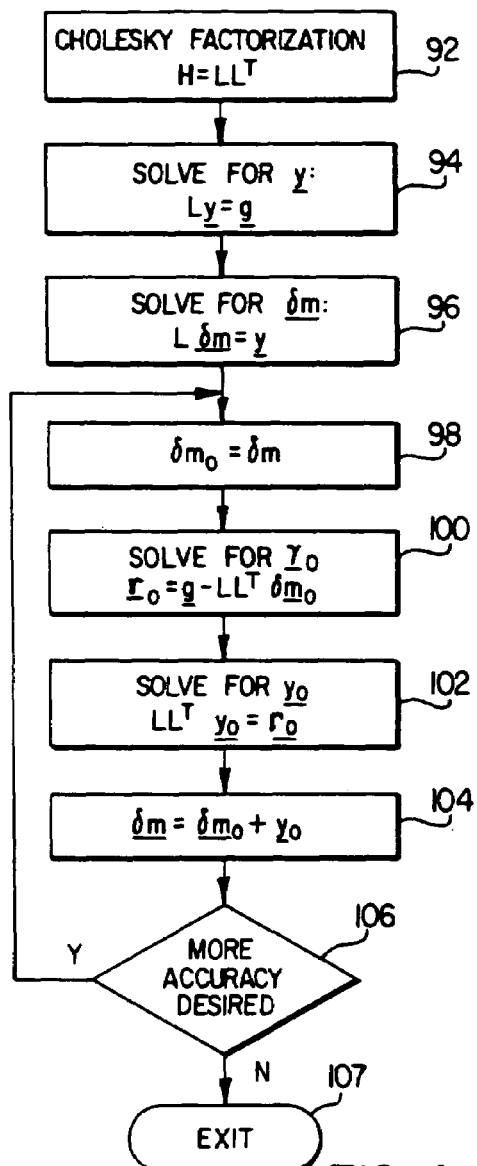
FIG. 4 is a flow chart describing calculation of the perturbation model.

The accuracy of the perturbation model, $\delta \underline{m}$, computed in this manner, may be improved as illustrated in blocks 98–107 of FIG. 4. In block 98, the solution for $\delta \underline{m}$ from block 96 is set as the initial solution, $\delta \underline{m}_0$. In block 100, a residual, $r_0$, is determined from the equation $\underline{r}_0 = \underline{g} - LL^T \delta \underline{m}_0$, using a double precision computer arithmatic. In block 102, the equation $L L^T \underline{y}_0 = \underline{r}_0$ is solved for the "correction", $\underline{y}_0$. In block 104, $\underline{y}_0$ is added to $\delta \underline{m}_0$ to provide a more accurate solution for the perturbation, $\delta \underline{m}$. As indicated in decision block 106, if more accuracy is desired the loop starting at block 98 may be repeated. This algorithm used to improved accuracy of the initial perturbation solution has the advantage requiring only one double precision calculation for the remainder in block 100; the other two calculations in blocks 102 and 104 may be performed using single precision computations.

The system error model has both direction and magnitude. However, to establish the optimum magnitude of the perturbation, the preferred method is to perform a linear search, which allows non-linearities of higher degree in the system error function to influence the optimum magnitude. The purpose of the linear search is to determine the weight of the pertubation $\underline{\delta}_m$ at which the system error $J_s$ is minimized. In the preferred embodiment Davidon's cubic interpolation method is utilized. Davidon's cubic interpolation method is described in detail in "Methods of Optimization", G. R. Walsh, John Wiley & Sons (1975).

Figure 5:
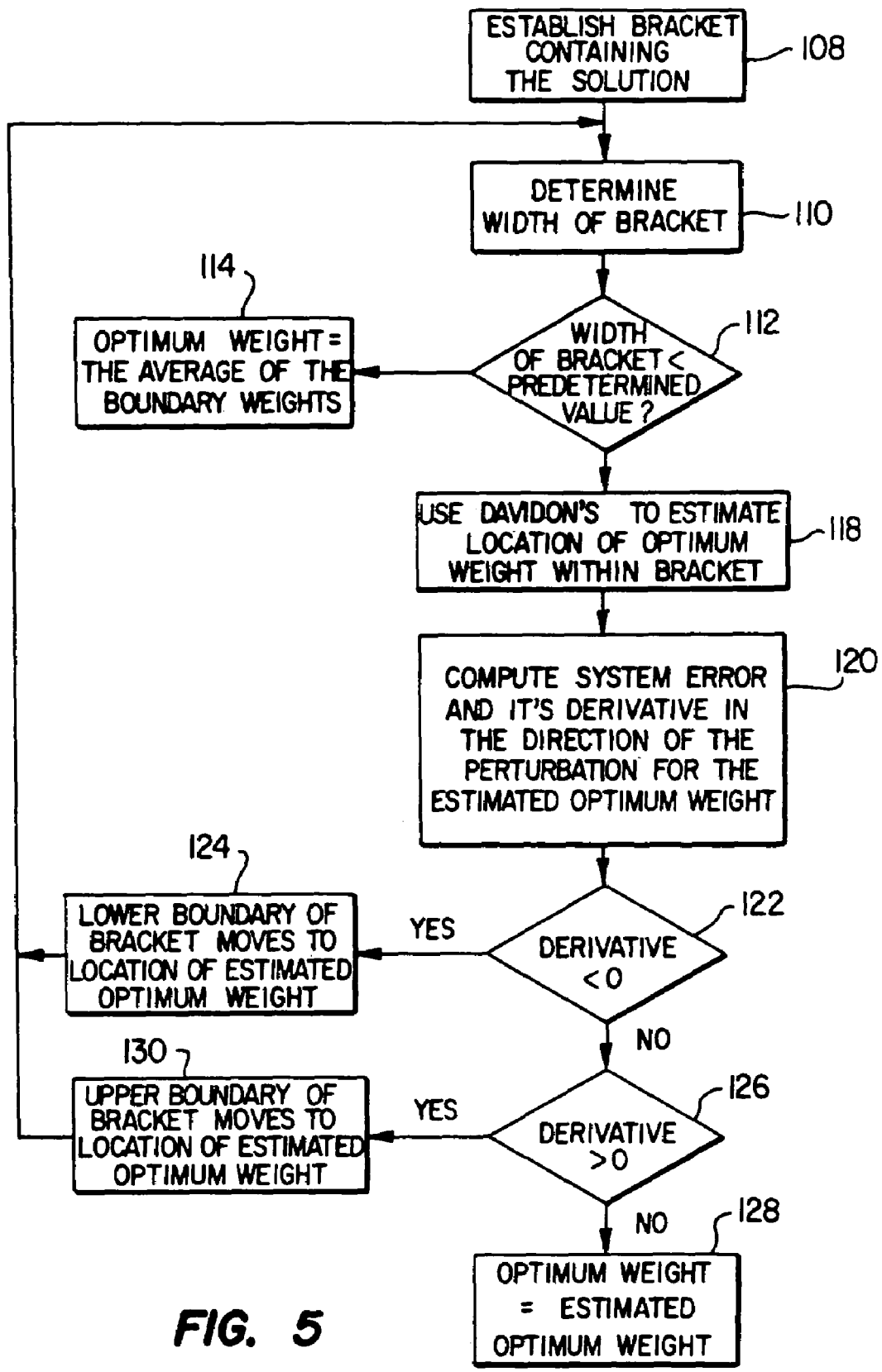
FIG. 5 is a flow chart describing calculation of the perturbation magnitude.

A flow chart outlining the Davidon algorithm is illustrated in FIG. 5. In block 108, a "bracket" having an upper and lower boundaries is established. Within the bracket, the optimum weight (magnitude) of the perturbation is located. The bracket may be determined by a trial-and-trial procedure, or by the procedure discussed hereinafter in connection with FIG. 6.

Block 110 is the first step of iterative loop used to narrow the boundaries of the bracket. In block 110, the width of the bracket, i.e., the distance between the upper and lower boundaries, is determined. In block 112, the width of the bracket is compared to a predetermined value. The predetermined value corresponds to a width at which further precision in determining the optimum weight of the perturbation no longer warrants additional computational time. If the width of the bracket is less than or equal to the predetermined value, then the optimum weight is set to a value equal to the arthimatic average of the boundary weights as illustrated in block 114. If the widths of the bracket is greater than the predetermined value in block 112, then Davidon's cubic interpolation algorithm is used to estimate the location of the optimum weight within the bracket in block 118. Davidon's cubic interpolation method computes a cubic polynomial estimating the system error $J_s$ based on the values of the system error and the derivative of the system error at the upper and lower bracket boundaries. The minimum value of the cubic polynomial can be determined from its derivative. The estimated optimum weight is set to the point at which the cubic polynomial is at a minimum. In block 120, the actual system error and its derivatives in the direction of the perturbation are computed for the estimated optimum weight determined in block 118. In decision block 122, if the derivative determined in block 120 is less than zero, then the lower boundary of the bracket moves to the location of the estimated optimum weight determined in block 118, thus narrowing the width of the bracket. If the derivative is not less than zero in decision block 122, and the derivative is greater than zero in decision block 126, the upper boundary of the bracket moves to the location of the estimated optimum weight, as described in block 130. If the derivative is either less than zero in block 122 or greater than zero in block 126, then the loop repeated starting at block 110. If the derivative is equal to zero, then the optimum weight is set equal to the estimated optimum weight.

After a number of iterations, the width of the bracket will be less than the predetermined value given in block 110. At this point, the linear search is completed, and the optimum weight is selected as the average between the boundary weights in block 114, or as specified in block 128.

In some instances, $J_s$ may be substantially flat around its minimum, resulting in a slow convergence. If successive iterations of the bracketing algorithm are producing new boundaries for one side of the bracket without alternation between upper and lower boundaries, then steps must be taken to aid convergence. For example, if successive iterations of the algorithm have produced only incremental changes in the upper boundary, then the lower boundary should be moved closer to the upper boundary by a predetermined factor, such as by one third of the width between the upper and lower boundaries.

Figure 6:
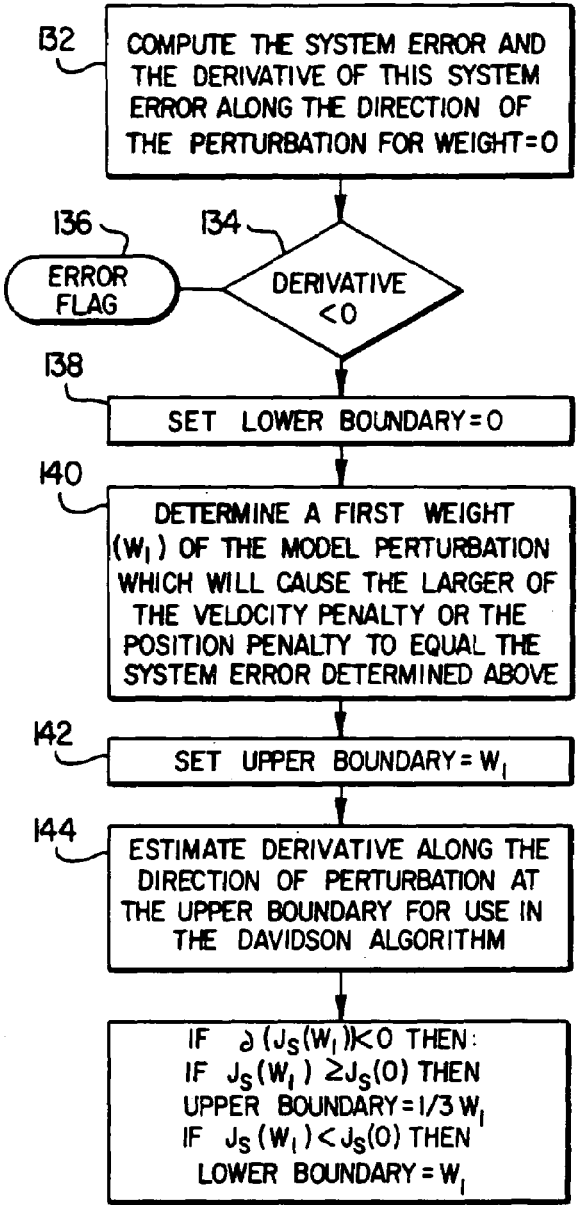
FIG. 6 is a flow chart describing calculation of the initial brackets.

FIG. 6 illustrates a flow chart for determining the initial bracket boundaries. In block 132, the system error and its derivative along the direction of the perturbation is computed for a weight equal to zero. In decision block 134, the derivative of the system error is checked for a negative condition; if the derivative is equal to or greater than zero, then an error flag is returned in block 136, indicating that no reduction of system error is possible in the direction of the perturbation as calculated. If the derivative is less than zero, then the lower boundary is set for a weight of zero in block 138. Assuming a non-negative derivative of the system error, a first weight ($W_1$) of the model perturbation is determined such that the larger of the velocity penalty or the position penalty will equal the system error determined in block 132. In block 142, the upper boundary is set to equal $W_1$. In block 144, the derivative of the system error along the direction of the perturbation at the upper boundary is evaluated for use in the Davidon's algorithm of FIG. 5. If the derivative of the system error is negative at $W_1$, Davidon's cubic polynomial will not be able to compute a suitable approximation of the system error between the upper and lower boundaries. In this instance, the boundaries are relocated as described in block 145. If the value of the system error at $W_1$ exceeds or equals the value of the system error at the lower boundary, then the upper boundary is set at $\frac{1}{3}W_1$. Otherwise, the lower boundary is set at $W_1$ and the upper boundary is set at $2W_1$.

After the optimum weight of the perturbation is determined, the resident model 66 is updated by adding the perturbation multipled by the optimum weight to the resident model 66. The new resident model is tested to determine whether further iterations would be fruitful, i.e., whether successive perturbations of the resident model will have a significant effect on the range determination. By calculating a magnitude of the perturbation, and comparing it with a predetermined limit, the capacity for further improvement of the resident model 66 is evaluated. If no further iterations are necessary, the resident model is considered valid and can be used to compute the range at any time in the data collection interval. The system will continue iterate after the range determinations are valid in order to update the range information and to detect path deviations by target 12.

As described in connection with FIGS. 2a–b, it is necessary ownship 10 to accelerate relative to target 12, in order to allow computation of the range. A method for determining the "optimum maneuver" which will produce acceleration (or deceleration) in a direction having maximum insensitivity to errors in the measured sighting vectors 25 is illustrated in the flow chart of FIG. 7. In Block 146, the sighting vector ($\underline{w}$) 25 is shown in terms of the elevation (E) and the azimuth (A). In Block 148, a matrix W is defined as the sum of the sighting vector times its transpose over N sightings. The eigenvalues of the matrix W are determined in Block 150. In block 152, an eigenvector, $\underline{v}$, associated with the smallest eigenvalue found in Block 150, is determined. This eigenvector is used in Block 154 to advise ownship 10 of the change of direction which will minimize errors due to noise in the sighting data. Hence, if ownship 10 is travelling with a normalized velocity vector of (1,0,0) and the eigenvector, $\underline{u}$, has a value of (0,1,0), the new direction would be equalled to $\underline{v}+k\underline{u}=(1,k,0)$, where k is a positive or negative real value. The factor k is a predetermined value chosen to reflect ownship's ability to change directions substantially instantaneously. The eigenvalues and eigenvectors of matrix W may be determined using well known mathimatical techniques.

Figure 9:
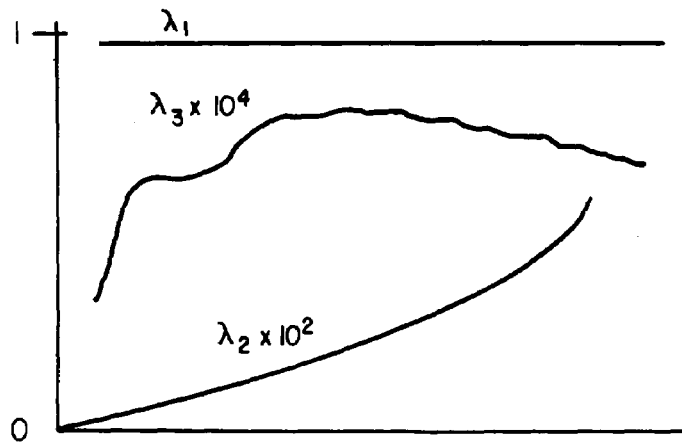
FIG. 9 is a graph of the system eigenvalues.
Figure 8:
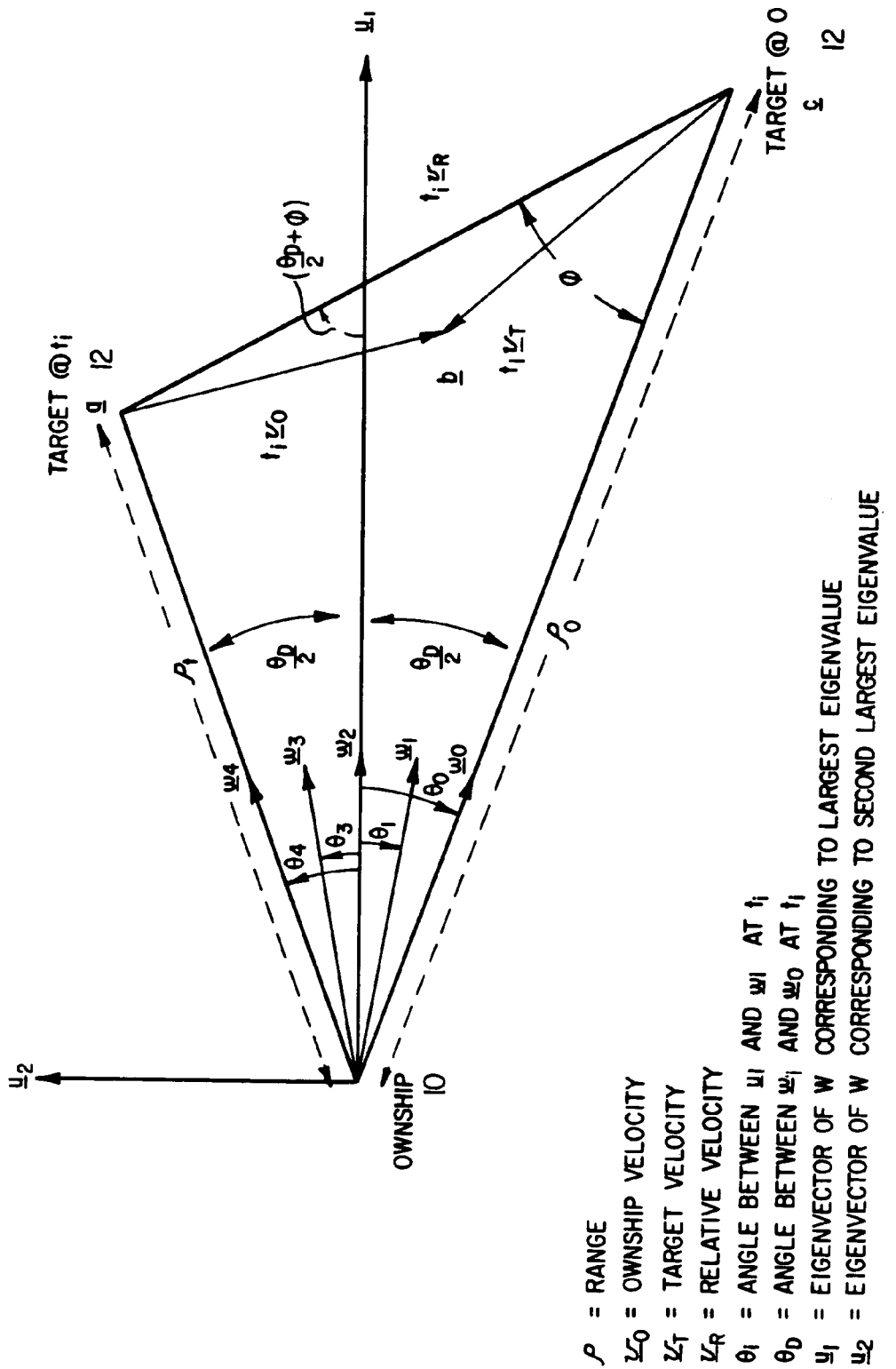
FIG. 8 is a diagram describing the formation of the initialization model.

As previously shown, range cannot be determined when both target 12 and ownship 10 fly with constant velocity. However, range can be estimated by assuming target speed (the magnitude of the target's velocity). By determining the estimated range, all of the model parameters are established. Thus, the initialization model 64 may be established after an estimated range is computed. The preferred method of computing the initialization model 64 is illustrated in FIGS. 8 and 9. The method uses the results obtained in the flight path advisor illustrated in FIG. 7.

FIG. 8 illustrates relative target positions at time $t_0$ and time $t_i$. The axis $\underline{u}_1$ and $\underline{u}_2$ are eigenvectors of the matrix W, defined in relation to FIG. 7, which correspond to the largest and second largest eigenvalues respectively. Typical eigenvalues of the matrix W are illustrated in FIG. 9.

To solve for the initial value of the target velocity, $\underline{v}_T$:

$$\underline{v}_T = [<\underline{u}_1, \underline{v}_0> - \rho_0\beta \cos((\theta_D/2)+\phi)]\underline{u}_1 + [<\underline{u}_2, \underline{v}_0> + \rho_0\beta \sin((\theta_D/2)+\phi)]\underline{u}_2 + [<\underline{u}_3, \underline{v}_0>]\underline{u}_3$$

where:

$\underline{u}_1, \underline{u}_2, \underline{u}_3$—eigenvectors corresponding to largest, second largest, and third largest eigenvalues of matrix W $\underline{v}_0$—ownship velocity vector $\theta_D$—angle between $\theta_0$ and $\theta_i$, calculated as $(12\lambda_2)^{1/2}$, where $\lambda_2$ is the second largest eigenvalue of matrix W.

$\phi$—angle between $\underline{w}_0$ and $\underline{v}_r$ where $\underline{v}_r$ is the relative velocity vector The acquisition range is given by:

$$\rho_0 = [-B - (B^2 - AC)^{1/2}]/A$$

where $A = \beta^2$ $B = [<\underline{u}_2, \underline{v}_0> \sin((\theta_D/2)+\phi) - <\underline{u}_1, \underline{v}_0> \cos((\theta_D/2)+\phi)]$ $C = \mu_0^2 - \mu_T^2$ ($\mu_0$ and $\mu_T$ are the speeds of the ownship and target)

and $\beta = [(f^2 + s_1^2)/(t_1^2(1+S_1^2))]^{1/2}$ where $S_1 = \tan(\theta_1);\ S_2 = \tan(\theta_2)$ $f^2 = [(t_1/t_2)^2(1+S_1^2)^2 - 2(t_1/t_2)(1+S_1^2)(S_1^2+(S_1/S_2)) + (S_1^2+(S_1/S_2))^2]S_2^2/(S_2-S_1)^2$ the initial target position, c in FIG. 9, can be determined as:

$$\underline{c} = \rho_0(\cos((\theta_D/2)\underline{u}_1 - \sin(\theta_D/2)\underline{u}_2)$$

Referring now to FIG. 10, a hardware implementation of the ranging system is illustrated. A processor 180 is connected to a program memory 181 and a storage memory 182 and two arithmetic coprocessors 184 and 186. Input data measurements 60 are input to the processor 180, and range determination outputs are output from the processor 180.

Comparing FIG. 3 with the hardware implementation of FIG. 10, the storage memory 182 is used to implement the measurement buffer 62 and to store interim calculations of the synthetic measurements 70, sighting errors 74, sighting error model 76, position penalty model 78, speed penalty model 82, system error model 88, perturbation model 90, resident model 66, and initialization model 64. The processor 180 manages data transfers between the storage memory 182, the arithmetic coprocessors 184 and 186, and the data input and output 60 and 188. The program memory 181 supplies the instruction for processor 180. The program memory 181 may be internal to the processor 180. In the preferred embodiment, a TMS 320 signal processor is used as the processor 180, although other microprocessors may be substituted as well. The arithmetic coprocessors 184 and 186 are used to facilitate calculation of the Hessian matrices and the gradient vectors associated with sighting error model 76, the position penalty model 78, and the speed penalty model 82. Also, the arithmetic coprocessors 184 and 186 are used to determine the magnitude and direction of the perturbation model and to calculate the initialization model 64.

Input data measurements 60 are preferably filtered prior to input to the memory 182. The filter serves to enhance the signal to noise ratio of the data, while providing a down-sampling function.

It is important to note that other implementations for the ranging system may be substituted for the implementation illustrated in FIG. 10. For example, a plurality of processors 180 may be utilized in order to increase the processing speed of the implementation. Since increased processing speed may allow the input data to be received at shorter time intervals, this alternative may be desirable for some applications. If multiple processors are used, it may be advantageous to provide separate memories for some or all of the processors in order to prevent a bottleneck from occurring at the storage memory 182. Alternatively, if greater processing speed is required, the ranging system could be implemented using a pipeline configuration, wherein discrete arithmetic components replaced the functions performed by the processor 180. However, while a pipeline configuration can greatly increase processing speed, the number of additional components used in this implementation may result in a system which is too large or too costly in comparison with the benefits of increased processing speed.

Although the present invention has been described in detail, it should be understood that various changes, substitution and alterations can be made therein without departing from the spirit and scope of the invention as defined by the appended claims.

TECHNICAL ADVANTAGES OF THE INVENTION

It is an important technical advantage of the invention that the range between two aircraft can be accurately calculated from data subject to noise.

It is a further technical advantage that the invention can determine the range between two aircraft from passively detected data.

It is another technical advantage that a flight path optimizing ranging performance may be calculated.

It is yet another technical advantage that the invention supplies ranging information quickly.

It is yet a further technical advantage that the invention provides range information from directional data.

It is yet a further technical advantage that the invention provides a method for determining initial estimates of the targets position and velocity.

What is claimed is:

1. A method of determining the range between a target plane and a monitoring plane comprising the steps of:
   generating model data corresponding to selected parameters describing flight path characteristics of the target plane;
   passively collecting actual flight path data of the target plane;
   generating an error measurement from said model data and said actual flight path data;
   adjusting said model data to reduce said error measurement; and
   calculating the range from said model data.

2. The method of claim 1 wherein said selected parameters include measurements of the target plane's velocity and position.

3. The method of claim 1 wherein said actual flight path information includes measurements of elevation and azimuth of the target plane relative to a predefined coordinate system.

4. The method of claim 1, and further including the steps of:
   determining an azimuth sighting error by subtracting a measurement of azimuth of the target based on said model data from a measurement of azimuth based on said actual target flight path data; and
   determining an elevation sighting error by subtracting a measurement of elevation of the target based on said model data from a measurement of the azimuth based on said actual target flight path data.

5. The method of claim 4 wherein said error measurement includes a mean squared sighting error determined as an average of the sum of the squares of said azimuth sighting error and said elevation sighting error over a plurality of intervals at which actual target flight path information is collected.

6. The method of claim 5 wherein said error measurement further includes a velocity penalty based on a deviation between an estimated velocity of the target derived from said model data and a predetermined nominal velocity.

7. The method of claim 5 wherein said error measurement further includes an azimuth position penalty based on a deviation between said azimuth sighting error and a predetermined azimuth sighting error bandwidth.

8. The method of claim 5 wherein said error measurement further includes an elevation position penalty based on a deviation between said elevation sighting error and a predetermined elevation sighting error bandwidth.

9. The method of claim 5 wherein said error measurement further includes a maximum range position penalty imposed when the estimated range of the target plane derived from said model data is in excess of a predetermined maximum acquisition range.

10. A method of determining the range between target plane and a monitoring plane comprising the steps of:
    generating model data corresponding to selected parameters describing flight path characteristics of the target plane;
    passively collecting actual flight path data of the target plane;
    generating an error measurement from said model data and said actual flight path data;
    calculating a perturbation model, said perturbation model indicating a change in said model data which reduces said error measurement;
    adjusting said model data in accordance with said perturbation model; and
    calculating the range from said model data.

11. The method of claim 10 and further including the step of deriving a second-order Taylor series approximation of an error measurement equation used to calculate said error measurement.

12. The method of claim 11 wherein said step of calculating the perturbation model includes the steps of:
    determining a perturbation direction which minimizes said second-order Taylor Series approximation of said error measurement; and
    determining an optimum perturbation magnitude along said perturbation direction which minimizes said error measurement.

13. The method of claim 12 wherein said step of determining said perturbation direction includes the steps of:

determining a gradient vector of the error measurement equation;

determining a matrix having elements which are the second derivatives of the error measurement equation with respect to said model parameters;

determining a perturbation vector such that said matrix multiplied by perturbation vector equals said gradient vector; and defining a perturbation direction in the direction of said perturbation vector.

14. The method of claim 12 wherein said step of determining an optimum perturbation magnitude includes the steps of:

defining lower and upper magnitude boundaries encompassing said optimum perturbation;

determining values of said error measurement equation at said lower and upper magnitude boundaries;

determining values of the derivative of said error measurement equation at said lower and upper magnitude boundaries;

calculating a polynomial approximation of said error measurement equation;

calculating an intermediate magnitude at which a derivative of said polynomial approximation is equal to zero;

calculating a value of the derivative of the error measurement equation at said intermediate magnitude;

setting said lower magnitude boundary equal to said intermediate magnitude if said value of said derivative of the error measurement equation at said intermediate magnitude is negative;

setting said upper magnitude boundary equal to the intermediate magnitude if said value of the derivative of the error measurement equation at said intermediate magnitude is positive;

setting said optimum perturbation magnitude equal td said intermediate magnitude if said value of the derivative of the error measurement equation at said intermediate magnitude is equal to zero; and setting said optimum perturbation magnitude equal to an average of said lower and upper magnitude boundaries if said lower and upper magnitude boundaries are within a predetermined range.

15. A method of determining the range between a target plane and a monitoring plane comprising the steps of:

passively collecting actual flight path data of the target plane;

generating model data corresponding to selected parameters describing flight path characteristics of the target plane;

adjusting the flight path of the monitoring plane in a direction optimizing ranging performance;

generating an error measurement from said model data and said actual flight path data;

adjusting said model data to reduce said error measurement; and calculating the range from said model data.

16. The method of claim 15 wherein said step of adjusting the flight path include the steps of:

determining sighting vectors between the monitoring plane and the target plane at a plurality of time intervals;

calculating a sighting matrix W such that $$W = (1/N)\sum_{n=O}^{N-1} \underline{w}_n \underline{w}_n T$$

where $\underline{w}_n$ is a sighting vector at time $t_n$ and N is the number of time intervals over which the summation is calculated; and adjusting the flight path of the monitoring plane in a direction given by an eigenvector corresponding to the smallest eigenvalue of matrix W.

17. The method of claim 2, further including the step of generating initial model data.

18. The method of claim 17, wherein said initial model data includes an initial target velocity $v_T$ calculated as:

$$\underline{v}_T = [<\underline{u}_1, \underline{v}_0> - \rho_0\beta \cos((\theta_D/2)+\phi)]\underline{u}_1 + [<\underline{u}_2,\underline{v}_0> - \tau_0\beta \sin((\theta_D/2)+\phi)]\underline{u}_2 + [<\underline{u}_3, \underline{v}_0>]\underline{u}_3$$

where:

$\underline{u}_1, \underline{u}_2, \underline{u}_3$—eigenvectors corresponding to largest, second largest and third largest eigenvalues of matrix W, $\underline{v}_0$—ownship velocity vector $\theta_D$—angle between $\theta_0$ and $\theta_t$, calculated as $[12\lambda_2]^{1/2}$, where $\lambda_2$ is the second largest eigenvalue of matrix W, $\phi$—angle between $\underline{w}_0$ and $\underline{v}_r$, where $\underline{v}_r$ is the relative velocity vector.

19. The method of claim 17, wherein said initial model data includes as initial target position c calculated as:

$$\underline{c} = \rho_0(\cos((\theta_D/2)\underline{u}_1 - \sin(\theta_D/2)\underline{u}_2)$$

where:

$$\rho_0 = [-B - (B^2 - AC)^{1/2}]/A$$

where $A = \beta^2$ $B = \beta[<u_2,v_0>\sin((\theta_D/2)+\phi) - <u_1,v_0>\cos((\theta_D/2)+\phi)]$ $C = \mu_0^2 - \mu_T^2$ ($\mu_0$ and $\mu_T$ are the speeds of the ownship and target)

and $\beta = [(f^2 + s_1^2)/(t_1^2 (1+S_1))]^{1/2}$ where $S_1 = \tan(\theta_1)$; $S_2 = \tan(\theta_2)$ $f^2 = [(t_1/t_2)^2 \quad (1+S_1^2)^2 - 2(t_1/t_2)(1+S_1^2)(S_1^2+(S_1/S_2)) + (S_1^2+(S_1/S_2))^2]S_2^2 S_2^2/(S_2-S_1)$.

20. Apparatus for determining the range between a target plane and a monitoring plane comprising:

a passive sensor for collecting actual flight path data of the target plane;

a processing device for performing arithmetic calculations;

said processing device operable to generate model data corresponding to select parameters describing flight path characteristics of the target plane;

said processing device further being operable to generate an error measurement from said model data and said actual flight path data and to adjust said model data to reduce said error measurement in order to calculate the range from said model data.

21. The apparatus of claim 20 wherein said processing device comprises a plurality of processing elements including microprocessors and arithmetic coprocessors.

22. The apparatus of claim 20 wherein said processing device is operable to generate measurements of the target plane velocity and position.

23. The apparatus of claim 20 wherein said receiver collects measurements of elevation and azimuth of the target plane relative to a predefined coordinate system.

24. The apparatus of claim 20 wherein said processing device is operable to calculate an azimuth sighting error determined by calculating an estimated azimuth measurement based on said model data and subtracting said estimated azimuth from a measurement of azimuth based on said actual target flight path data, said processing device being further operable to calculate an elevation sighting error determined by calculating an estimated elevation of the target based on said model data and subtracting said estimated elevation from a measurement of azimuth based on said actual flight path data.

25. The apparatus of claim 24 wherein said error measurement includes a means squared sighting error determined as the average of the sum of the squares of the azimuth sighting error and the elevation sighting error over a plurality of intervals at which actual target flight path information is collected.

26. The apparatus of claim 25 wherein said error measurement further includes a velocity penalty based on deviation between an estimated velocity of the target derived from said model data and a predetermined nominal velocity.

27. The apparatus of claim 25 wherein said error measurement further includes an azimuth position penalty based on the deviation between said azimuth sighting error and a predetermined azimuth sighting error bandwidth.

28. The method of claim 25, wherein said error measurement further includes an elevation position penalty based on the deviation between said elevation sighting error and a predetermined elevation sighting error bandwidth.

29. The method of claim 25 wherein said error measurement further includes a maximum range position penalty imposed when an estimated range of the target plane derived from the model data is in excess of a predetermined maximum range.

30. An apparatus for determining the range between the target plane and a monitoring plane comprising:
   means for passively collecting actual flight path data of the target plane;
   means for generating model data corresponding to selected parameters describing flight path characteristics of the target plane;
   means for generating an error measurement from said model data and said actual flight path data;
   means for calculating a perturbation model, said perturbation model indicating a change in said model data which reduces said error measurement;
   means for adjusting said model data in accordance with said perturbation model; and
   means for calculating the range from said model data.

31. The apparatus of claim 30 and further comprising means for calculating said error measurement from a second-order Taylor series of approximation of an error measurement equation.

32. The apparatus of claim 31 wherein said means for adjusting said model data comprises:
   means for determining a direction for perturbating said model data in which said second-order Taylor series approximation of said error measurement is minimized; and
   means for determining an optimum magnitude along said perturbation direction which minimizes said error measurement.

33. The apparatus of claim 32 wherein said means for determining said perturbation direction includes:

means for determining a gradient vector of the error measurement equation;
   means for determining a matrix having elements comprising the second derivatives of the error measurement equation with respect to the model parameter; and
   means for determining a perturbation vector such that said matrix multiplied by said perturbation vector equals said gradient vector.

34. The apparatus of claim 32 wherein said means for determining an optimum perturbation magnitude includes:
   means for choosing initial lower and upper magnitude boundaries encompassing said optimum perturbation;
   means for determining a value of the error measurement equation at said lower and upper magnitude boundaries;
   means for determining a value of the derivative of said error measurement equation at said lower and upper magnitude boundaries;
   means for calculating a polynomial approximation of said error measurement equation from said values of said error measurement equation and said values of the derivative of said error measurement equation at said lower and upper magnitude boundaries;
   means for calculating an intermediate magnitude at which the derivative of said polynomial approximation is equal to zero;
   means for calculating a value of the derivative of the error measurement equation at said intermediate magnitude;
   means for adjusting said lower and upper magnitude boundaries, said lower boundary set equal to said intermediate magnitude if said value of the derivative of the error measurement equation is negative, and said upper magnitude boundary set equal to said intermediate magnitude if said value of the derivative of the error measurement equation is positive; and
   said optimum perturbation magnitude set equal to a value of the average of said lower and upper magnitude boundaries if said lower and upper boundaries are within a predetermined range.

35. An apparatus for determining the range between the target plane and a monitoring plane comprising:
   a passive receiver for collecting actual flight path data of the target plane;
   a processor for generating model data corresponding to selected parameters describing flight path characteristics of the target plane; and
   said processor calculating a flight path of the monitoring plane which optimizes ranging performance.

36. The apparatus of claim 35 wherein:
   said receiver collects data from which sighting vectors between the monitoring plane and the target plane may be determined at a plurality of time intervals;
   said processor is operable to calculate a sighting matrix W such that $$W = (1/N) \sum_{n=0}^{N-1} w_n w_n T$$

where $w_n$ is sighting a vector at times $t_n$ and N is the number of time intervals over which the summation is calculated; and said processor is operable to calculate an eigenvector corresponding to the smallest eigenvalue of said matrix W, said eigenvalue giving an optimum direction for said flight path.

37. The apparatus of claim 20 wherein said processing device is operable to calculate initial model data.

38. The apparatus of claim 37 wherein said processing device is operable to calculate initial target velocity data $v_T$ such that $$v_T = [<u_1, v_0> - \rho_0\beta\cos((\theta_D/2)+\phi)]u_1 + [<u_2, v_0> - \rho_0\beta\sin((\theta_D/2)+\phi)]u_2 + [<u_3, v_0>]u_3$$

where:

$u_1, u_2, u_3$—eigenvectors corresponding to largest, second largest, and third largest eigenvalues of matrix W $v_0$—ownship velocity vector $\theta_D$—angle between $\theta_0$ and $\theta_i$, calculated as $[12\lambda_2]^{1/2}$, where $\lambda_2$ is the second largest eigenvalue of matrix W, $\phi$—angle between $w_0$ and $v_r$, where $v_r$ is the relative velocity vector.

39. The apparatus of claim 37 wherein said processing device is operable to calculate initial target position data c such that $$c = \rho_0(\cos((\theta_D/2))u_1 - \sin(\theta_D/2)u_2)$$

where:

$$\rho_0 = [-B - (B^2 - AC)^{1/2}]/A$$

where $A = \beta^2$ $B = \beta[<u_2, v_0>\sin((\theta_D/2)+\phi) - <u_1, v_0>\cos((\theta_D/2)+\phi)]$ $C = \mu_0^2 - \mu_T^2$ ($\mu_0$ and $\mu_T$ are the speeds of the ownship and target)

and $\beta = [(f^2 + s_1^2)/(t_1^2(1+S_1))]^{1/2}$ where $S_1 = \tan(\theta_1); S_2 = \tan(\theta_2)$ $f^2 = [(t_1/t_2)^2 (1+S_1^2)^2 - 2(t_1/t_2)(1+S_1^2)(S_1^2+(S_1/S_2)) + (S_1^2+(S_1/S_2))^2]S_2^2 S_2^2/(S_2-S_1)$.

* * * * *

UNITED STATES PATENT AND TRADEMARK OFFICE
CERTIFICATE OF CORRECTION

| | | |
|---|---|---|
| PATENT NO. | : 7,002,510 B1 | Page 1 of 1 |
| APPLICATION NO. | : 07/456812 | |
| DATED | : February 21, 2006 | |
| INVENTOR(S) | : William Clay Choate et al. | |

It is certified that error appears in the above-identified patent and that said Letters Patent is hereby corrected as shown below:

<u>Column 4:</u>
Line 60, after "ownship 10 at" delete "t" and insert -- $t_2$ --.

<u>Column 7:</u>
Line 33, after "and" delete "$VE_{mi}$ and $VA_{mi}$" and insert -- $\nabla E_{mi}$ and $\nabla A_{mi}$ --.

Line 48, after "involving" delete "$VE_{mi}$ and $VA_{mi}$" and insert -- $\nabla E_{mi}$ and $\nabla A_{mi}$ --.

<u>Column 12:</u>
Line 30, after "B=" insert -- β -- and after "ø)-" delete "<" and insert -- ´ --.

<u>Column 15:</u>
Line 39, after "magnitude equal" delete "td" and insert -- to --.

<u>Column 16:</u>
Line 20, after "$\underline{V}_0$>-" delete "$t_0$" and insert -- $\rho_0$ --.

Line 30, after "target position" delete "c" and insert -- <u>c</u> --.

<u>Column 20:</u>
Line 2, after "position data" delete "c" and insert -- <u>c</u> --.

Signed and Sealed this

First Day of July, 2008

JON W. DUDAS
*Director of the United States Patent and Trademark Office*